(12) United States Patent
Zhao (10) Patent No.: US 8,855,272 B2
(45) Date of Patent: Oct. 7, 2014

(54) SYSTEM AND METHOD FOR IMPLEMENTING MULTIMEDIA CALLING LINE IDENTIFICATION PRESENTATION SERVICE

(75) Inventor: Junxian Zhao, Guangdong (CN)

(73) Assignee: Inventergy, Inc., Campbell, CA (US)

( * ) Notice: Subject to any disclaimer, the term of this patent is extended or adjusted under 35 U.S.C. 154(b) by 2144 days.

(21) Appl. No.: 11/698,891

(22) Filed: Jan. 29, 2007

(65) Prior Publication Data

US 2007/0201635 A1 Aug. 30, 2007

(30) Foreign Application Priority Data

Feb. 24, 2006 (CN) .......................... 2006 1 0057699

(51) Int. Cl.
*H04M 11/00* (2006.01)
*H04L 29/06* (2006.01)
*H04M 3/42* (2006.01)

(52) U.S. Cl.
CPC ............ *H04L 29/06* (2013.01); *H04L 65/1083* (2013.01); *H04L 65/1069* (2013.01); *H04L 65/4007* (2013.01); *H04M 3/42042* (2013.01); *H04L 65/1006* (2013.01); *H04L 65/1096* (2013.01); *H04L 65/1016* (2013.01); *H04L 29/06027* (2013.01)
USPC .................. 379/88.13; 379/88.19; 379/88.21; 379/88.23; 379/88.24; 379/375.01; 379/418; 379/419

(58) Field of Classification Search
CPC ...................... H04M 3/42017; H04M 3/42068; H04M 3/42153; H04M 3/02; H04M 3/42059; H04M 19/04; H04M 19/041; H04M 2203/352; H04M 3/42042; H04L 29/06; H04L 65/1006

USPC ......... 370/356, 352; 379/88.13, 88.19, 88.21, 379/88.23, 88.24, 375.01, 418, 419
See application file for complete search history.

(56) References Cited

U.S. PATENT DOCUMENTS

| 6,542,489 | B1 | 4/2003 | Kari et al. |
| 2004/0032946 | A1* | 2/2004 | Koser et al. ............... 379/373.01 |
| 2004/0109558 | A1* | 6/2004 | Koch ....................... 379/373.01 |
| 2005/0226174 | A1 | 10/2005 | Kiss |

(Continued)

FOREIGN PATENT DOCUMENTS

| CN | 1520211 A | 11/2004 |
| JP | 2002165013 A | 7/2002 |
| KR | 20040093836 A | 11/2004 |

OTHER PUBLICATIONS

Foreign Communication from a counterpart application, PCT application PCT/CN20061002933, English Translation of International Preliminary Report on Patentability dated Feb. 22, 2007, 4 pages.

(Continued)

*Primary Examiner* — Asad Nawaz
*Assistant Examiner* — Najeebuddin Ansari
(74) *Attorney, Agent, or Firm* — Workman Nydeggger (57) ABSTRACT

Embodiments of the present invention provide a system for implementing a CLIP service, which includes: a resource storage entity used for storing multimedia resources subscribed by a calling terminal; a resource playing entity used for downloading the multimedia resources from the resource storage entity and playing the multimedia resources; a CLIP service management entity used for obtaining a storage address of the multimedia resources and sending the storage address of the multimedia resources to the resource playing entity. Embodiments of the present invention further provide a method and apparatus for implementing the CLIP service. The system, method and apparatus for implementing the CLIP service in the embodiments of the present invention enable the calling terminal to subscribe to the multimedia resources for a called terminal.

18 Claims, 6 Drawing Sheets

(56) References Cited

U.S. PATENT DOCUMENTS

| | | | |
|---|---|---|---|
| 2006/0023862 A1* | 2/2006 | Sutcliffe | 379/257 |
| 2006/0165059 A1* | 7/2006 | Batni et al. | 370/352 |
| 2006/0177044 A1* | 8/2006 | O'Neil et al. | 379/373.02 |
| 2006/0199570 A1* | 9/2006 | Vendrow | 455/415 |
| 2006/0215829 A1* | 9/2006 | Schwartz | 379/207.02 |
| 2006/0291639 A1* | 12/2006 | Radziewicz et al. | 379/211.01 |
| 2007/0064921 A1* | 3/2007 | Albukerk et al. | 379/373.02 |
| 2007/0116253 A1* | 5/2007 | Batni et al. | 379/399.01 |
| 2007/0161412 A1* | 7/2007 | Nevid et al. | 455/567 |
| 2007/0189474 A1* | 8/2007 | Cai | 379/142.01 |

OTHER PUBLICATIONS

Foreign Communication from a counterpart application, Chinese application 200680011755.5, Office Action dated Apr. 13, 2010, 49 pages.

Foreign Communication from a counterpart application, Chinese application 200680011755.5, Partial English Translation Office Action dated Apr. 13, 2010, 11 pages.

"3rd Generation Partnership Project; Technical Specification Group Services and System Aspects; IP Multimedia Subsystem (IMS); Stage 2 (Release 7)," 3GPP TS 23.228 v7.2.0 (Dec. 2005).

"3rd Generation Partnership Project; Technical Specification Group Core Network and Terminals; Signalling Flows for the IP Multimedia Call Control Based on Session Initiation Protocol (SIP) and Session Description Protocol (SDP); Stage 3 (Release 5)," 3GPP TS 24.228 v5.14.0 (Dec. 2005).

Rosenberg, et al., "SIP: Session Initiation Protocol", RFC 3261, Jun. 2002.

Camarillo, "The Early Session Disposition Type for the Session Initiation Protocol (SIP)," RFC 3959, Dec. 2004.

* cited by examiner

SYSTEM AND METHOD FOR IMPLEMENTING MULTIMEDIA CALLING LINE IDENTIFICATION PRESENTATION SERVICE

CROSS-REFERENCE TO RELATED APPLICATIONS

This application claims priority of Chinese Patent Application No. 200610057699.0, filed Feb. 24, 2006, the disclosure of which is hereby incorporated by reference in its entirety.

FIELD OF THE INVENTION

The present invention relates to the system and method for implementing a Multimedia Calling Line Identification Presentation (CLIP) service, more particularly to a system and method for implementing the CLIP service in an Internet Protocol Multimedia Subsystem (IMS).

BACKGROUND OF THE INVENTION

At present, with the continuous development of telecommunication technology, users have increasing demands for the telecommunication service, and a number of personalized telecommunication services have come forth thereby. However, there is no such service that allows a calling terminal to subscribe to multimedia resources used as a ringing prompt for a called terminal. For the convenience of description, such service is called a CLIP service for short hereinafter, and the multimedia resources that are subscribed by the calling terminal and used as a ringing prompt to play for the called terminal may include at least one of image, text, audio and video.

SUMMARY OF THE INVENTION

Embodiments of the present invention provide a system and a method for implementing a Multimedia Calling Line Identification Presentation (CLIP) service, which enables a calling terminal to subscribe to multimedia resources for a called terminal.

Embodiments of the present invention also provide an Application Server (AS) for implementing management for the CLIP service; a user terminal as a called terminal of the CLIP service so as to play the multimedia resources subscribed by the calling terminal for the called terminal; and a Multimedia Resource Function (MRF) for playing, for the called terminal, the multimedia resources subscribed by the calling terminal in the CLIP service.

A system for implementing a CLIP service includes:
a resource storage entity, for storing multimedia resources subscribed by a calling terminal;
a resource playing entity, for downloading the multimedia resources from the resource storage entity and playing the multimedia resources;
a CLIP service management entity, for obtaining a storage address of the multimedia resources and sending the storage address of the multimedia resources to the resource playing entity.

A method for implementing a CLIP service includes:
storing multimedia resources subscribed by a calling terminal in a resource storage entity;
obtaining, by a CLIP service management entity, a storage address of the multimedia resources, and sending the storage address of the multimedia resources to a resource playing entity;
downloading, by the resource playing entity, the multimedia resources from the resource storage entity according to the storage address of the multimedia resources, and playing the multimedia resources.

An AS, as an AS registered by a third party standing for a calling terminal in a CLIP service, includes:
a multimedia resource notification module, for obtaining a storage address of multimedia resources subscribed by the calling terminal and sending the storage address of the multimedia resources to a resource playing entity after receiving formal session information sent by the calling terminal.

A user terminal, as a called terminal in a CLIP service, includes:
a multimedia resource downloading module, for downloading multimedia resources from a resource storage entity after receiving a storage address of the multimedia resources subscribed by a calling terminal, wherein the storage address of the multimedia resources is sent by a CLIP service management entity;
a multimedia resource playing module, for playing the multimedia resources before a called user is off-hook, and stopping playing the multimedia resources after detecting that the called user is off-hook.

An MRF includes:
a multimedia resource downloading module, for downloading multimedia resources subscribed by a calling terminal from a resource storage entity after receiving a storage address of the multimedia resources, wherein the storage address of the multimedia resources is sent by a CLIP service management entity;
a multimedia resource playing module, for exchanging multimedia session information with a called terminal, establishing a media channel for playing the multimedia resources between the multimedia resource playing module and the called terminal, playing the multimedia resources for the called terminal through the media channel, and stopping playing the multimedia resources after receiving an off-hook event of the called user sent by the CLIP service management entity.

As can be seen from the above mentioned technical scheme, the multimedia resources subscribed by the calling terminal is stored in the resource storage entity accessed by the resource playing entity with the capability of downloading and playing the multimedia resources. When the calling terminal calls the called terminal, the CLIP service management entity sends the storage address of the multimedia resources to the resource playing entity, the resource playing entity then downloads the multimedia resources from the resource storage entity, and plays the multimedia resources for the called terminal when it is needed to play a ringing prompt for the called terminal according to the calling procedure. Therefore, the embodiments of the present invention enable the calling terminal to subscribe to the multimedia resources for the called terminal.

DETAILED DESCRIPTION OF THE INVENTION

The present invention will be hereinafter described in detail with reference to the accompanying drawings and embodiments. It should be understood that the described specific embodiments are only used for illustrating the present invention and not for limiting the present invention.

Embodiments of the present invention include: storing multimedia resources subscribed by a calling terminal in a resource storage entity that may be accessed by a resource playing entity with the capability of downloading and playing the multimedia resources; when the calling terminal calls a called terminal, a CLIP service management entity sending a storage address of the multimedia resources to the resource playing entity, the resource playing entity then downloading the multimedia resources from the resource storage entity and playing the multimedia resources for the called terminal.

Figure 1:
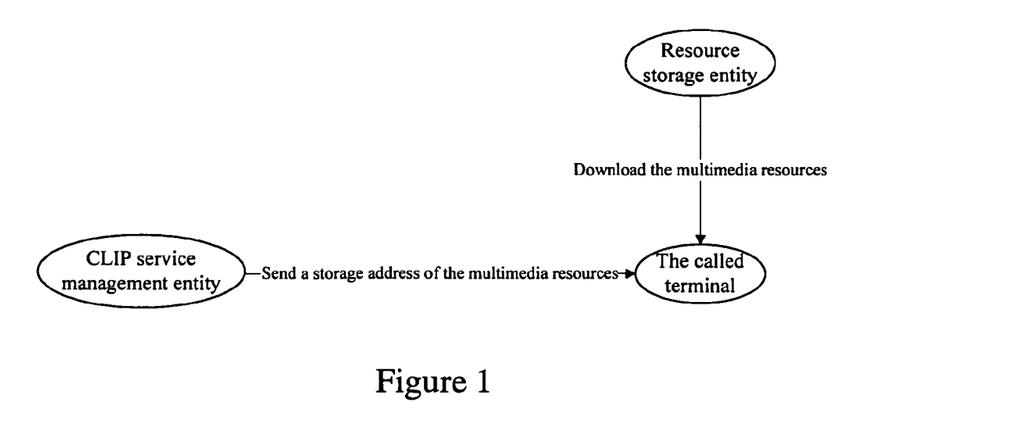
FIG. 1 is a schematic diagram illustrating a networking structure of an exemplary system for implementing a CLIP service according to an embodiment of the present invention.

FIG. 1 is a schematic diagram illustrating a networking structure of an exemplary system for implementing a CLIP service according to an embodiment of the present invention. In the exemplary system of FIG. 1, the called terminal is taken as the resource playing entity. In this embodiment, the called terminal is required to be capable of downloading and playing multimedia resources.

After the calling terminal subscribes to a CLIP service, multimedia resources subscribed by the calling terminal are stored in a resource storage entity that may be accessed by the called terminal, and a CLIP service management entity may obtain, in real time, the storage address of the multimedia resources.

The CLIP service management entity is used for, when the calling terminal calls the called terminal, sending the storage address of the multimedia resources to the called terminal.

The called terminal is used for downloading the multimedia resources from the resource storage entity and, when it is needed to play a ringing prompt for the called terminal according to the calling procedure, playing the multimedia resources.

Figure 2:
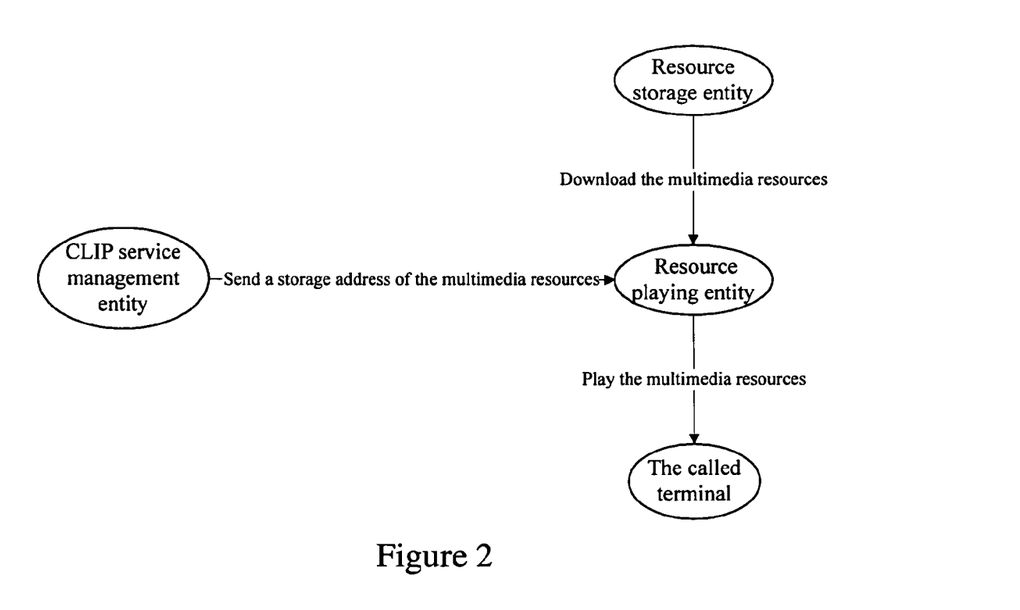
FIG. 2 is a schematic diagram illustrating a networking structure of another exemplary system for implementing a CLIP service according to an embodiment of the present invention.

FIG. 2 is a schematic diagram illustrating a networking structure of another exemplary system for implementing a CLIP service according to an embodiment of the present invention. In the exemplary system of FIG. 2, an entity except the called terminal is taken as the resource playing entity with the capability of downloading and playing multimedia resources. In this embodiment, the called terminal is not required to be capable of downloading and playing the multimedia resources.

After the calling terminal subscribes to a CLIP service, multimedia resources subscribed by the calling terminal is stored in a resource storage entity that may be accessed by the resource playing entity, and a CLIP service management entity may obtain, in real time, the storage address of the multimedia resources.

The CLIP service management entity is used for, when the calling terminal calls the called terminal, sending the storage address of the multimedia resources to the resource playing entity, establishing a media channel for playing the multimedia resources between the resource playing entity and the called terminal by forwarding multimedia session information exchanged between the resource playing entity and the called terminal, and instructing the resource playing entity to stop playing the multimedia resources for the called terminal after receiving an off-hook event of the called user.

The resource playing entity is used for downloading the multimedia resources from the resource storage entity and, when it is needed to play a ringing prompt for the called terminal according to the calling procedure, playing the multimedia resources for the called terminal. In different networks, different network entities may be taken as the resource playing entity, for example in an IMS framework, a Multimedia Resource Function (MRF) may be taken as the resource playing entity.

In the following embodiments, an example of implementing a CLIP service in an IMS framework is taken so as to describe the implementation of the CLIP service.

In the IMS network, services are usually provided by an Application Server (AS), so the AS is taken as a CLIP service management entity in the following embodiments. Preferably, the AS registered by a third party standing for the calling terminal is taken as the CLIP service management entity. The AS registered by the third party standing for the calling terminal means such AS that is registered by the third party, generally a Serving Call Server Management Function (S-CSCF) standing for the calling terminal.

The First Embodiment

This embodiment adopts the principle of the first exemplary system for implementing a CLIP service, in other words, the called terminal in this embodiment is capable of downloading and playing multimedia resources.

In this embodiment, the multimedia resources subscribed by the calling terminal is stored in a resource storage entity that may be addressed through a Uniform Resource Locator (URL) address in the IMS network, and an AS that may obtain, in real time, the URL address of the multimedia resources is taken as the CLIP service management entity. Specifically, the URL address of the multimedia resources may be stored in the AS or in such data center as a Home Subscriber Server (HSS) that the AS may access and obtain data from.

Figure 3A:
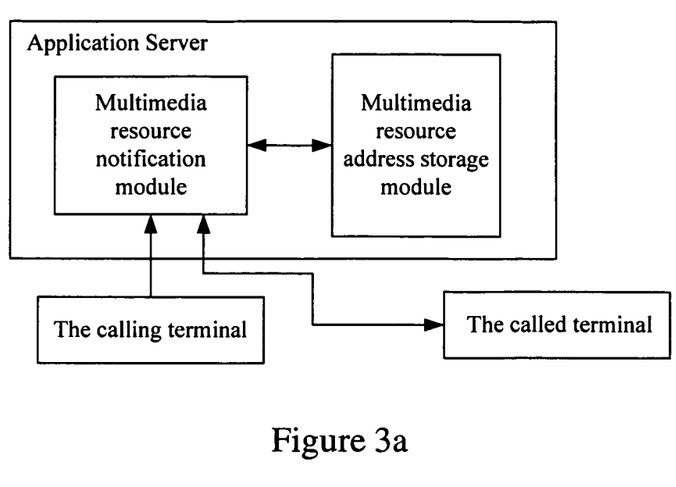
FIG. 3a is a schematic diagram illustrating a structure of the AS according to an embodiment of the present invention.

FIG. 3a is a schematic diagram illustrating a structure of the AS in this embodiment. As shown in FIG. 3a, the AS in this embodiment includes:

a multimedia resource notification module, for obtaining a storage address of the multimedia resources and sending the storage address of the multimedia resources to the called terminal after receiving formal session information sent by the calling terminal.

Optionally, the AS further includes: a multimedia resource address storage module, for storing the storage address of the multimedia resources.

Figure 3B:
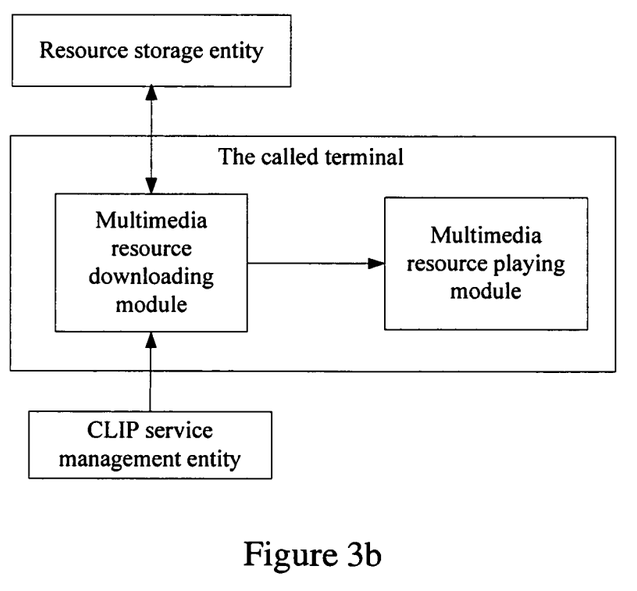
FIG. 3b is a schematic diagram illustrating a structure of the called terminal according to an embodiment of the present invention.

FIG. 3b is a schematic diagram illustrating a structure of the called terminal taken as the resource playing entity. As shown in FIG. 3b, in this embodiment, the called terminal includes:

a multimedia resource downloading module, used for downloading the multimedia resources from a resource storage entity after receiving the storage address of the multimedia resources that is sent by the AS;

a multimedia resource playing module, used for playing the multimedia resources before the called user is off-hook, and stopping playing the multimedia resources after detecting that the user is off-hook.

Figure 3C:
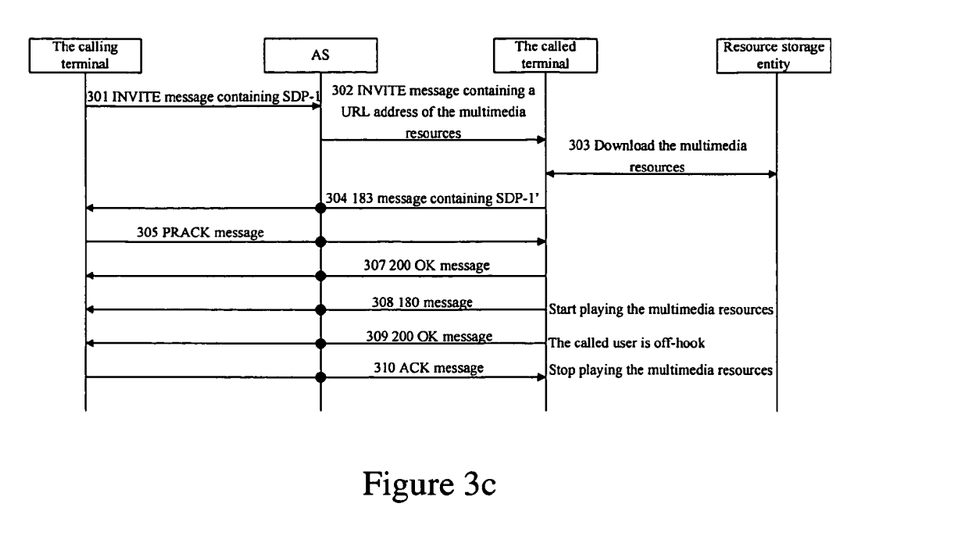
FIG. 3c is a flowchart illustrating an implementation of the CLIP service in an IMS according to an embodiment of the present invention.

FIG. 3c is a flowchart illustrating an implementation of the CLIP service in an IMS in this embodiment. The method for implementing a CLIP service in the IMS in this embodiment includes the following steps.

Step 301: the calling terminal that has subscribed to multimedia resources sends to the AS an INVITE message containing a Session Description Protocol (SDP) message body describing formal session information. Hereinafter, the SDP message body describing the formal session information is identified as SDP-1.

Step 302: the AS obtains a URL address of the multimedia resources, adds the URL address to the INVITE message, and sends the INVITE message to the called terminal. Specifically, the URL address may be added to a Call-Info header or other optional fields like Alert-Info of the INVITE message, or to an extensible Mark Language (XML) script.

The AS may obtain the URL address of the multimedia resources from URL address records of multimedia resources stored locally or from a data center for storing the URL addresses of multimedia resources, e.g., an HSS.

Step 303: the called terminal downloads the multimedia resources from the resource storage entity according to the URL address in the INVITE message. Therein, corresponding downloading modes may be adopted respectively according to different URL address formats, for example Hypertext Transfer Protocol (HTTP) or File Transfer Protocol (FTP).

Steps 304 to 307: the called terminal returns a 183 message indicating the session progress to the calling terminal through the AS, and the 183 message contains an SDP message body SDP-1' that is used for responding to the SDP-1 by the called terminal and used for describing negotiated formal session information. The calling terminal sends a Provisional Acknowledgement (PRACK) message in response to the 183 message to the called terminal through the AS, and then the called terminal returns a 200 OK message in response to the PRACK message to the calling terminal through the AS.

Step 308: the called terminal starts playing the multimedia resources and sends a 180 message indicating the ringing of the called terminal to the calling terminal through the AS. The called terminal may start playing the multimedia resources before sending the 180 message or send the 180 message before starting playing the multimedia resources, and there is no strict execution order.

Steps 309 to 310: when the called user is off-hook, the called terminal sends a 200 OK message indicating the off-hook of the called user to the calling terminal through the AS. The calling terminal, through the AS, returns an Acknowledgement (ACK) message in response to the 200 OK message sent by the called terminal to the called terminal, and then the called terminal stops playing the multimedia resources.

Thus far, the CLIP service terminates and a media channel for the formal session between the calling terminal and the called terminal has been established completely.

The Second Embodiment

This embodiment adopts the principle of the second exemplary system for implementing a CLIP service, that is, except the called terminal, an entity with the capability of downloading and playing the multimedia resources in the IMS network is taken as the resource playing entity. Generally, an MRF is taken as the resource playing entity in the IMS. The MRF may play the multimedia resources for the called terminal by a Real-time Transfer Protocol (RTP) media stream mode. Accordingly, the multimedia resources in this embodiment may be played by the RTP media stream mode.

In this embodiment, the multimedia resources subscribed by the calling terminal is stored in a resource storage entity in the IMS that may be addressed through a URL address, and the AS which may obtain, in real-time, the URL address of the multimedia resources is taken as a CLIP service management entity. Specifically, the URL address of the multimedia resources may be stored in the AS or in a data center which may be accessed by the AS, such as an HSS.

Figure 4A:
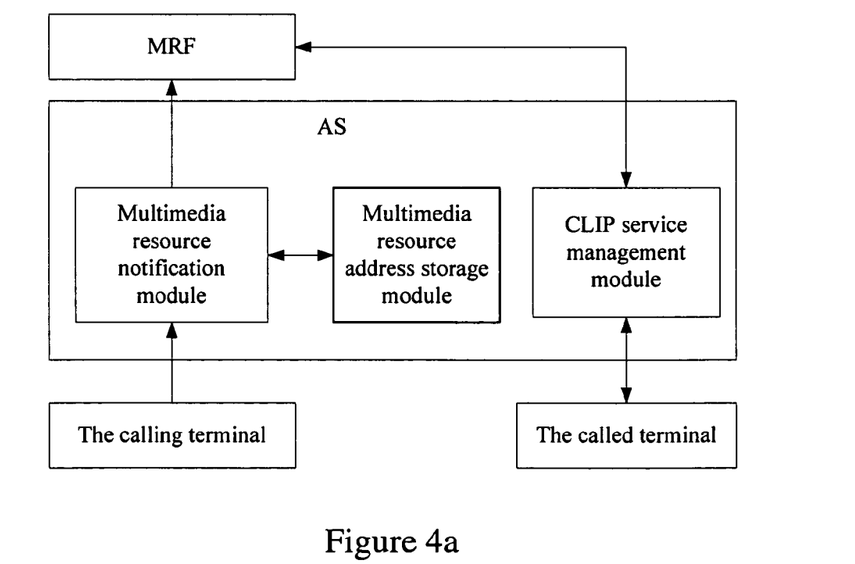
FIG. 4a is a schematic diagram illustrating a structure of the AS according to an embodiment of the present invention.

FIG. 4a is a schematic diagram illustrating a structure of the AS in this embodiment. In this embodiment, the AS includes:

a multimedia resource notification module, used for obtaining a storage address of the multimedia resources and sending the storage address to an MRF after receiving formal session information sent by the calling terminal;

a CLIP service management module, used for establishing a media channel for playing the multimedia resources between the MRF and the called terminal by forwarding multimedia session information exchanged between the MRF and the called terminal, and instructing the MRF to stop playing the multimedia resources for the called terminal after receiving an off-hook event of the called user.

Optionally, the AS further includes a multimedia resource address storage module, which is used for storing the storage address of the multimedia resources.

Figure 4B:
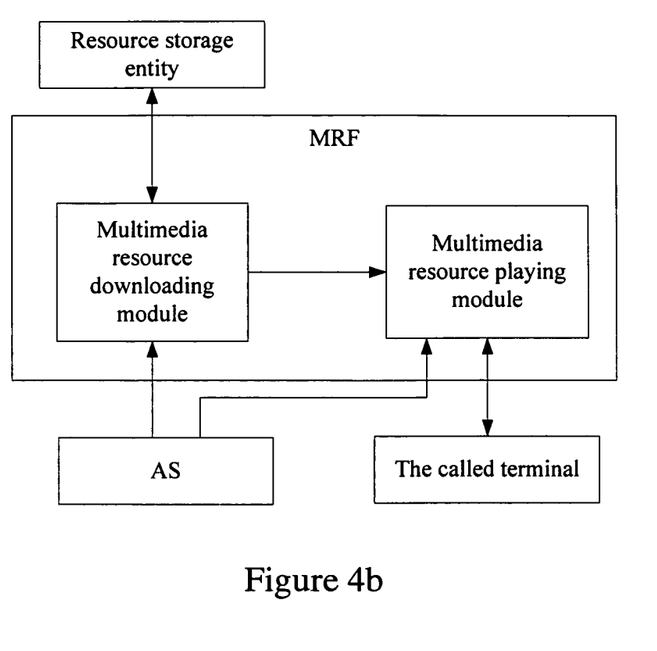
FIG. 4b is a schematic diagram illustrating a structure of the MRF in an embodiment of the present invention.

FIG. 4b is a schematic diagram illustrating a structure of the MRF in this embodiment. As shown in FIG. 4b, in this embodiment, the MRF includes:

a multimedia resource downloading module, used for downloading the multimedia resources from a resource storage entity after receiving the storage address of the multimedia resources that is sent by the AS;

a multimedia resource playing module, used for exchanging the multimedia session information with the called terminal, establishing a media channel for playing the multimedia resources between the multimedia resource playing module and the called terminal, playing the multimedia resources for the called terminal through the media channel, and stopping playing the multimedia resources for the called terminal after receiving an off-hook event of the called user sent by the AS.

Figure 4C:
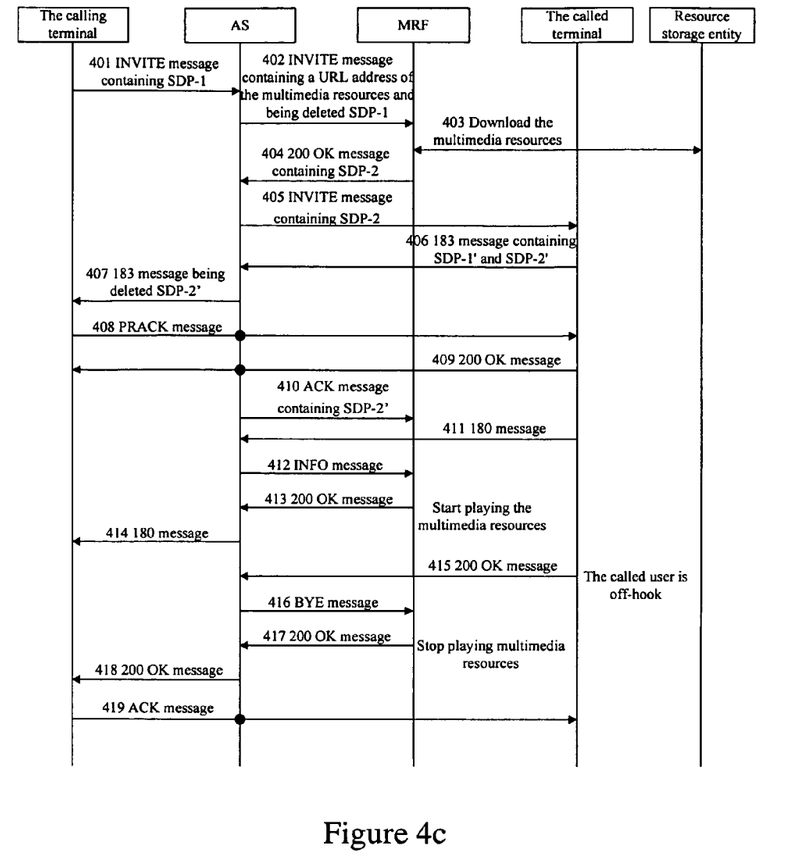
FIG. 4c is a flowchart illustrating an implementation of the CLIP service in an IMS according to an embodiment of the present invention.

FIG. 4c is a flowchart illustrating an implementation of the CLIP service in an IMS in this embodiment. As shown in FIG. 4, the implementation of a CLIP service in the IMS includes the following steps.

Step 401: the calling terminal that has subscribed to multimedia resources sends to the AS an INVITE message containing an SDP message body describing formal session information. Hereinafter, the SDP message body describing the formal session information is identified as SDP-1.

Step 402: the AS deletes the SDP-1 from the INVITE message, adds a URL address of the multimedia resources to the INVITE message and then sends the INVITE message to the MRF. Specifically, the URL address may be added to a Call-Info header or other optional fields like Alert-Info of the INVITE message, or to an XML script.

Step 403: the MRF downloads the multimedia resources from the resource storage entity according to the URL address in the INVITE message. Corresponding downloading modes may be adopted respectively, such as HTT or FTP, according to different URL address formats.

Step 404: the MRF returns to the AS a 200 OK message containing the SDP message body describing session information of the MRF playing the multimedia resources for the called terminal. The session of the MRF playing the multimedia resources for the called terminal is called a multimedia session for short hereinafter, and the SDP message body describing the session information of the MRF playing the multimedia resources is identified as SDP-2 in this embodiment.

Step 405: the AS adds the SDP-2 to the INVITE message sent by the calling terminal and sends the INVITE message to the called terminal. The INVITE message sent by the AS to the called terminal contains both the SDP-1 and the SDP-2.

Step 406: the called terminal returns to the AS a 183 message containing an SDP message body SDP-1' for responding to the SDP-1 by the called terminal and an SDP message body SDP-2' for responding to the SDP-2 by the called terminal. Specifically, the SDP-1' is used for describing negotiated formal session information, while the SDP-2' is used for describing negotiated multimedia session information.

Steps 407 to 409: the AS deletes the SDP-2' from the 183 message and returns the 183 message to the calling terminal. The calling terminal sends a PRACK message in response to the 183 message to the called terminal through the AS, and the called terminal returns a 200 OK message in response to the PRACK message to the calling terminal through the AS.

Step 410: the AS returns the ACK message containing the SDP-2' to the MRF.

Thus far, a media channel for the multimedia session between the MRF and the called terminal has been established completely.

Steps 411 to 414: the called terminal sends a 180 message to the AS, the AS sends to the MRF an INFO message instructing the MRF to start playing the multimedia resources, the MRF returns a 200 OK message in response to the INFO message to the AS and starts playing the multimedia resources for the called terminal through the media channel between the MRF and the called terminal, and then the AS forwards the 180 message to the calling terminal.

Steps 415 to 417: when the called user is off-hook, the called terminal sends to the AS a 200 OK message indicating the off-hook of the called user. The AS sends to the MRF a BYE message instructing the MRF to stop playing the multimedia resources, the MRF stops playing the multimedia resources for the called terminal through the media channel between the MRF and the called terminal, and then returns a 200 OK message in response to the BYE message to the AS.

Thus far, the CLIP service terminates.

Steps 418 to 419: the AS forwards to the calling terminal the 200 OK message indicating the off-hook of the called user. The calling terminal returns to the called terminal an ACK message for responding the 200 OK message sent by the calling terminal through the AS.

Hereby, a media channel for the formal session between the calling terminal and the called terminal has been established completely.

It should be noted that, the CLIP service is a kind of calling subscription service, and the calling user may either subscribe to or cancel the CLIP service. If the calling user has subscribed to the CLIP service, the multimedia resources may be used during the calling procedure; otherwise, such CLIP service may not be used. The called terminal may determine whether to accept the multimedia resources subscribed by the calling terminal as required. For example, the called user may determine to display the multimedia resources by subscribing to a multimedia resource display service. If the called user has subscribed to the multimedia resource display service, the multimedia resources will be displayed; otherwise, the multimedia resources will not be displayed. The called user may determine not to display the multimedia resources by subscribing to a multimedia resource display restriction service. If the called user has subscribed to the multimedia resource display restriction service, the multimedia resources will not be displayed; otherwise, the multimedia resources will be displayed.

The Third Embodiment

The present embodiment also adopts the principle of the second exemplary system for implementing a CLIP service. The main difference from the second embodiment lies in: the second embodiment adopts an earlier media scheme of an application server model, namely using two SDP message bodies, one SDP message body is used for describing the formal session information, while the other SDP message body is used for describing the multimedia session information. Embodiments of the present invention adopt an earlier media scheme of a gateway model, namely that one SDP message body is used for describing both the formal session information and the multimedia session information, that is, one part of the SDP message body is used for describing the formal session information and the other part is used for describing the multimedia session information.

The AS and the MRF in this embodiment have the same structures as the AS in FIG. 4a and the MRF in FIG. 4b respectively, so no more description is made in detail.

Figure 5:
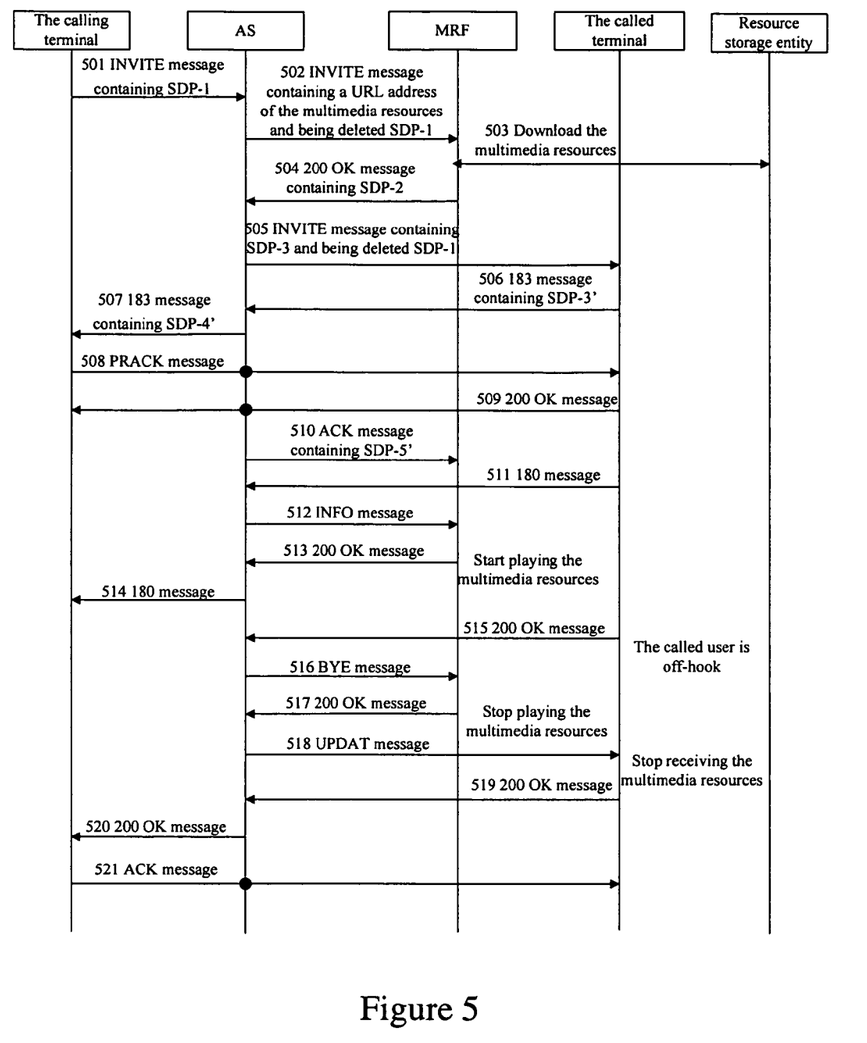
FIG. 5 is a flowchart illustrating an implementation of the CLIP service in an IMS according to an embodiment of the present invention.

FIG. 5 is a flowchart illustrating an implementation of the CLIP service in an IMS in this embodiment. As shown in FIG. 5, the implementation of a CLIP service in the IMS includes the following steps.

Step 501: the calling terminal that has subscribed to multimedia resources sends to the AS an INVITE message containing an SDP message body describing formal session information. Hereinafter, the SDP message body describing the formal session information is identified as SDP-1.

Step 502: the AS deletes the SDP-1 from the INVITE message, adds a URL address of the multimedia resources to the INVITE message and then sends the INVITE message to the MRF. Specifically, the URL address may be added to a Call-Info header or other optional fields like Alert-Info of the INVITE message, or to an XML script.

Step 503: the called terminal downloads the multimedia resources from a resource storage entity according to the URL address in the INVITE message. Corresponding downloading modes may be adopted respectively, such as HTTP or FTP, according to different URL address formats.

Step 504: the MRF returns to the AS a 200 OK message containing an SDP message body describing the multimedia session information. The SDP message body describing the multimedia session information is identified as SDP-2.

Step 505: the AS constructs an SDP message body describing both the formal session information and the multimedia session information, and the SDP message body newly constructed is called SDP-3 for short hereinafter. The AS deletes the SDP-1 from the INVITE message sent by the calling terminal, adds the SDP-3 to the INVITE message and then sends the INVITE message to the called terminal.

Step 506: the called terminal returns to the AS a 183 message containing an SDP message body SDP-3' for responding to the SDP-3 by the called terminal, in other words, the SDP-3' is used for describing both negotiated formal session information and negotiated multimedia session information simultaneously.

Step 507: the AS deletes the part describing the negotiated multimedia session information from the SDP-3', hereinafter, the SDP-3' that has gone through the deleting process is identified as SDP-4'. The AS sends a 183 message containing the SDP-4' to the calling terminal. The SDP-4' only describes the negotiated formal session information.

Steps 508 to 509: the calling terminal sends to the called terminal a PRACK message in response to the 183 message sent by the AS through the AS, and then the called terminal returns to the calling terminal a 200 OK message in response to the PRACK message through the AS.

Step 510: the AS deletes the part describing the negotiated formal session information from the SDP-3'. Hereinafter, the SDP-3' that has gone through the deleting process is identified as SDP-5'. The AS sends to the MRF an ACK message containing the SDP-5'. The SDP-5' only describes the negotiated multimedia session information. Thus far, the media channel for the multimedia session between the MRF and the called terminal has been established completely.

Steps 511 to 514: the called terminal sends a 180 message to the AS, the AS sends to the MRF an INFO message instructing the MRF to start playing the multimedia resources, the MRF returns a 200 OK message in response to the INFO message to the AS and starts playing the multimedia resources for the called terminal through the media channel between the MRF and the called terminal, and then the AS forwards the 180 message to the calling terminal.

Steps 515 to 517: when the called user is off-hook, the called terminal sends to the AS a 200 OK message indicting the off-hook of the called user. The AS sends to the MRF a BYE message instructing the MRF to stop playing the multimedia resources. The MRF stops playing multimedia resources for the called terminal through the media channel between the MRF and the called terminal, and then returns a 200 OK message in response to the BYE message to the AS.

Thus far, the CLIP service terminates.

Steps 518 to 521: the AS sends to the called terminal a UPDATE message for notifying the called terminal to modify the attribute of the multimedia session information part in the SDP-3' into deactivation, by which the called terminal may stop receiving the multimedia resources. The called terminal modifies the attribute of the multimedia session information part in the SDP-3' into the deactivation, stops receiving the multimedia resources and returns a 200 OK message in response to the UPDATE message to the AS. The AS forwards the 200 OK message indicating the off-hook of the called user to the calling terminal, and then the calling terminal returns an ACK message in response to the 200 OK message to the called terminal through the AS.

Hereby, the media channel for the formal session between the calling terminal and called terminal has been established completely.

The foregoing description is only a preferred embodiment of this invention and is not for use in limiting the protection scope thereof. All the modifications, equivalent replacements or improvements in the scope of the present invention's sprit and principles shall be included in the protection scope of the present invention.

What is claimed is:

1. A system for implementing a Multimedia Calling Line Identification Presentation (CLIP) service, comprising:
a resource storage entity, which stores a multimedia resource subscribed to by a calling terminal; and
a CLIP service management entity of an Application Server (AS), registered by a third party standing for the calling terminal, which obtains a storage address of the multimedia resource, sends the storage address of the multimedia resource to a resource playing entity comprising a Multimedia Resource Function (MRF) after the calling terminal initiates a session, and establishes a media channel between the resource playing entity and a called terminal,
wherein establishing the media channel includes:
the CLIP service management entity sending multimedia session information to the called terminal, the multimedia session information having been received by the CLIP service management entity from the resource playing entity; and
the CLIP service management entity sending negotiated multimedia session information to the resource playing entity, the negotiated multimedia session information having been received by the CLIP service management entity from the called terminal, and
wherein the resource playing entity downloads the multimedia resource from the resource storage entity according to the received storage address of the multimedia resource and plays the multimedia resource for the called terminal through the media channel.

2. The system of claim 1, wherein the resource storage entity is accessed by the AS or in the AS.

3. The system of claim 1, wherein sending the storage address of the multimedia resource to the resource playing entity after the calling terminal initiates the session occurs before the session is established.

4. A computer program product comprising one or more non-transitory computer-readable media having stored thereon computer-executable instructions that, when executed by one or more processors of a computer system, cause the computer system to implement a Multimedia Calling Line Identification Presentation (CLIP) service, including:
obtaining, by a CLIP service management entity comprising an application server (AS), a storage address of a multimedia resource subscribed to by a calling terminal;
sending, by the CLIP service management entity, the storage address of the multimedia resource to a resource playing entity comprising a Multimedia Resource Function (MRF) after the calling terminal initiates a session, wherein the multimedia resource subscribed to by the calling terminal is stored in a resource storage entity; and
establishing, by the CLIP service management entity, a media channel between the resource playing entity and a called terminal, including:
sending multimedia session information to the called terminal, the multimedia session information having been received by the CLIP service management entity from the resource playing entity; and
sending negotiated multimedia session information to the resource playing entity, the negotiated multimedia session information having been received by
the CLIP service management entity from the called terminal, wherein based on the CLIP service management entity establishing the media channel between the resource playing entity and the called terminal, the resource playing entity downloads the multimedia resource from the resource storage entity according to the storage address of the multimedia resource and plays the multimedia resource for the called terminal through the media channel.

5. The computer program product of claim 4, wherein a mode of downloading the multimedia resource is a Hypertext Transfer Protocol (HTTP) mode or a File Transfer Protocol (FTP) mode, and wherein the storage address of the multimedia resource is a Uniform Resource Locator (URL) address.

6. The computer program product of claim 5, wherein said obtaining the storage address of the multimedia resource comprises one of:
   obtaining, by the CLIP service management entity, the URL address of the multimedia resource that has been stored by the CLIP service management entity; and
   downloading, by the CLIP service management entity, the URL address of the multimedia resource from a Home Subscriber Server (HSS) accessed by the CLIP service management entity.

7. The computer program product of claim 5, wherein sending the storage address of the multimedia resource to the resource playing entity comprises:
   adding, by the CLIP service management entity, the URL address of the multimedia resource to an INVITE message; and
   sending, by the CLIP service management entity, the INVITE message to the resource playing entity.

8. The computer program product of claim 7, wherein the URL address of the multimedia resource is added to a Call-Info header or an Alert-Info field of the INVITE message, or to an extensible Mark Language (XML) script.

9. The computer program product of claim 6, wherein sending multimedia session information to the called terminal, the multimedia session information having been received by the CLIP service management entity from the resource playing entity comprises:
   sending, by the MRF, to the AS a first Session Description Protocol (SDP) message body describing the multimedia session information;
   sending, by the AS, to the called terminal the first SDP message; and
   sending, by the AS, to the called terminal a second SDP message, wherein the second SDP message is sent by the calling terminal and is used for describing formal session information when sending the first SDP message to the called terminal, and wherein returning the negotiated multimedia session information to the MRF through the AS comprises:
   returning, by the called terminal, to the AS a first response SDP message body describing the negotiated multimedia session information;
   returning, by the AS, the first response SDP message body to the MRF, wherein the called terminal returns to the AS a second response SDP message body describing negotiated formal session information when returning the first response SDP message body to the AS; and
   sending, by the AS, the second response SDP message body to the calling terminal when returning the first response SDP message body to the MRF.

10. The computer program product of claim 9,
    wherein the AS adds the first SDP message body and the second SDP message body to an INVITE message and sends the INVITE message to the called terminal.

11. The computer program product of claim 6, wherein sending multimedia session information to the called terminal, the multimedia session information having been received by the CLIP service management entity from the resource playing entity comprises:
    sending, by the MRF, to the AS a first SDP message body describing the multimedia session information;
    extracting, by the AS, formal session information from a second SDP message body sent by the calling terminal;
    extracting, by the AS, the multimedia session information from the first SDP message body sent by the MRF;
    generating, by the AS, a third SDP message body containing the multimedia session information and the formal session information; and
    sending the third SDP message body to the called terminal, wherein returning the negotiated multimedia session information to the MRF through the AS comprises:
    returning, by the called terminal, to the AS a third response SDP message body describing negotiated formal session information and negotiated multimedia session information;
    sending, by the AS, to the MRF a first response SDP message body describing the negotiated multimedia session information; and
    sending, by the AS, to the calling terminal a second response SDP message body describing the negotiated formal session information when sending to the MRF a first response SDP message body.

12. The computer program product of claim 11,
    wherein the AS adds the third SDP message body to an INVITE message and sends the INVITE message to the called terminal.

13. The computer program product of claim 4, wherein the resource playing entity plays the multimedia resource for a called terminal when the called terminal rings, and wherein the method further comprises: instructing, by the CLIP service management entity, the resource playing entity to stop playing the multimedia resource for the called terminal after receiving an off-hook event of the called user.

14. The computer program product of claim 13,
    wherein the CLIP service management entity is an AS, wherein the off-hook event of the called user is sent to the AS by the called terminal through a 200 OK message indicating the off-hook of the called user, and wherein instructing the resource playing entity to stop playing the multimedia resource for the called terminal comprises:
    sending, by the AS, to the MRF a BYE message notifying the MRF to stop playing the multimedia resource; and
    stopping, by the MRF, playing the multimedia resource for the called terminal after receiving the BYE message.

15. The computer program product of claim 13 further comprising:
    notifying, by the CLIP service management entity, the called terminal to stop receiving the multimedia resource; and
    notifying, by the CLIP service management entity, the calling terminal of the offhook event of the called user, so as to start a session between the calling terminal and the called terminal.

16. An Application Server (AS) device for implementing a Multimedia Calling Line Identification Presentation (CLIP) service, comprising:
    a multimedia resource notification module, which obtains a storage address of a multimedia resource stored by a resource storage entity and subscribed to by a calling terminal and sends the storage address of the multimedia resource to a resource playing entity comprising a Multimedia Resource Function (MRF) after receiving formal session information sent by the calling terminal; and
    a Call Line Identification Presentation (CLIP) service management module, which establishes a media channel for playing the multimedia resources between the resource playing entity and a called terminal by forwarding multimedia session information exchanged between the resource playing entity and the called terminal, wherein establishing the media channel includes:

the CLIP service management module sending multimedia session information to the called terminal, the multimedia session information having been received by the CLIP service management module from the resource playing entity; and the CLIP service management module sending negotiated multimedia session information to the resource playing entity, the negotiated multimedia session information having been received by the CLIP service management module from the called terminal, wherein the resource playing entity downloads the multimedia resource from a resource storage entity according to the storage address of the multimedia resource and plays the multimedia resource for the called terminal through the media channel.

17. The AS of claim 16, wherein the CLIP service management module also instructs the resource playing entity to stop playing the multimedia resource for the called terminal after receiving an off-hook event of the called user.

18. The AS of claim 16, further comprising: a multimedia resource address storage module which stores the storage address of the multimedia resource.

\* \* \* \* \*